(12) United States Patent
Jain et al.

(10) Patent No.: US 12,033,102 B2
(45) Date of Patent: Jul. 9, 2024

(54) RESOURCE TRANSFER MONITORING AND AUTHORIZATION

(71) Applicant: BANK OF AMERICA CORPORATION, Charlotte, NC (US)

(72) Inventors: Jeetendra Hukmichand Jain, Charlotte, NC (US); Heather Roseann Dolan, Sarasota, FL (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 259 days.

(21) Appl. No.: 17/527,812

(22) Filed: Nov. 16, 2021

(65) Prior Publication Data

US 2023/0153719 A1    May 18, 2023

(51) Int. Cl.
*G06Q 10/0631* (2023.01)
*G06F 16/903* (2019.01)
*G06Q 20/38* (2012.01)

(52) U.S. Cl.
CPC . *G06Q 10/06315* (2013.01); *G06F 16/90335* (2019.01); *G06Q 20/386* (2020.05)

(58) Field of Classification Search
CPC ....................... G06Q 10/06315; G06Q 20/386
See application file for complete search history.

(56) References Cited

U.S. PATENT DOCUMENTS

| | | | |
|---|---|---|---|
| 6,092,057 A * | 7/2000 | Zimmerman | G06Q 20/206 379/114.15 |
| 8,311,943 B2 | 11/2012 | Patterson | |
| 8,762,238 B2 | 6/2014 | Hahn-Carlson et al. | |
| 9,607,334 B2 | 3/2017 | Carroll et al. | |
| 9,947,007 B2 | 4/2018 | Greenbaum et al. | |
| 10,592,692 B2 | 3/2020 | Brannon et al. | |
| 10,776,518 B2 | 9/2020 | Barday et al. | |
| 10,817,856 B2 | 10/2020 | Berger et al. | |
| 10,943,003 B2 | 3/2021 | Bingham et al. | |
| 10,944,565 B2 | 3/2021 | Bingham et al. | |
| 2005/0149544 A1 | 7/2005 | Bishop et al. | |
| 2010/0299254 A1 | 11/2010 | Patterson | |
| 2014/0358769 A1 | 12/2014 | Howe et al. | |
| 2015/0206149 A1 * | 7/2015 | Kurian | G06Q 20/385 705/71 |

(Continued)

OTHER PUBLICATIONS

Lopez-Rojas et al, Social Simulation of Commercial and Financial Behaviour for Fraud Detection Research, Social Simulation Conference (Year: 2014).*

(Continued)

*Primary Examiner* — Andre D Boyce
(74) *Attorney, Agent, or Firm* — Moore & Van Allen PLLC; Andrew T. Wood (57) ABSTRACT

Embodiments of the invention are directed to a system, method, or computer program product for an approach for resource transfer monitoring and authorization. The system is configured to receive resource transfer stop criteria and store the resource transfer stop criteria. The system is configured to execute a query of a record keeping repository and identify one or more resource transfers in the record keeping repository which violate the resource transfer stop criteria. The system then flags the resource transfers which violate the resource transfer stop criteria. Thereafter, the system issues a resource credit and transmits a notification to the user.

17 Claims, 5 Drawing Sheets

(56) References Cited

U.S. PATENT DOCUMENTS

| | | |
|---|---|---|
| 2015/0339667 A1 | 11/2015 | Dua |
| 2016/0275760 A1* | 9/2016 | Block ................... G07F 19/203 |
| 2017/0178110 A1* | 6/2017 | Swanson ............. G06Q 20/223 |
| 2019/0005502 A1* | 1/2019 | Kumar ............... G06Q 30/0201 |
| 2020/0005322 A1 | 1/2020 | Cueli et al. |
| 2020/0186355 A1 | 6/2020 | Davies |
| 2021/0192548 A1* | 6/2021 | Wang ................. G06Q 30/0204 |
| 2021/0192651 A1* | 6/2021 | Groth ..................... G06N 20/00 |
| 2022/0019995 A1* | 1/2022 | Ngo .................... G06Q 20/385 |
| 2022/0180368 A1* | 6/2022 | Immaneni .......... G06Q 20/4014 |
| 2022/0309493 A1* | 9/2022 | Stipech .............. G06Q 20/3821 |

OTHER PUBLICATIONS

Juszczak et al, Off-the-peg and bespoke classifiers for fraud detection, Computational Statistics & Data Analysis vol. 52, Issue 9, May 15, 2008, pp. 4521-4532 (Year: 2008).*

* cited by examiner

RESOURCE TRANSFER MONITORING AND AUTHORIZATION

BACKGROUND

Currently, resource transfers undergo a real-time validation process at the time of the resource transfer. If a pending resource transfer is deauthorized by a user, an authorizing system is notified. However, in some instances the resources transfer is completed despite the deauthorization. As such, there is a need for a resource transfer monitoring and authorization system.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing apparatuses (e.g., a system, computer program product and/or other devices) and methods for a resource transfer monitoring and authorization.

Currently, an entity processes many resource transfers. Although the entity is able to prevent resource transfers after a customer requests a "stop" to prevent the transfers in the future, there are occasional instances where the stop is unsuccessful. The system described herein is able to continuously process resource transfers in batches on the back-end of the system such that a listing of resource transfers is compared to a listing of user-generated and provided resource transfer stop criteria. Currently, the challenges with stopping resource transfers occurs when a resource transfer is compared to the resource transfer stop criteria in real-time at the time of a resource transfer.

The system uses a record keeping repository and a resource stop repository to identify discrepancies between existing resource transfers and resource transfer stop criteria provided by users. The invention will query the ledgers of resource transfers in the record keeping repository to identify resource transfers to which a disposition shall be applied. The invention may then notify a user of the violation of a resource transfer stop request and obtain permission, notify, reverse the resource transfer to apply a credit, or the like.

The system is configured to notify a user on a user device of a channel of an entity such that a user receives a notification on a user device. The notification may request that the user provide additional input such that the entity adapts or amends the existing resource transfer stop criteria to the current preferences of the user. As such, the resource transfer stop criteria may be changed in a way which allows for a different disposition of the resource transfer at future effective dates, such as those which may occur on a periodic basis. Examples may include resource transfers for subscription-based services or products, or resource transfers which otherwise occur on a periodic basis. However, this system may also be implemented for any other type of resource transfer and may be adapted for any and all resource transfers at an entity.

Embodiments of the invention are directed to a system, method, or computer program product for resource transfer monitoring and authorization, the invention comprising receiving, from a user, resource transfer stop criteria for one or more resource transfers between the user and a merchant, wherein the resource transfer stop criteria is provided to an entity by the user.

In some embodiments, or in combination with any of the embodiments described herein, the system is configured for storing the resource transfer stop criteria in a resource transfer stop repository, wherein storing the resource transfer stop criteria comprises creating an index in the resource transfer stop repository.

In some embodiments, or in combination with any of the embodiments described herein, the system is configured for executing a query of a record keeping repository with the resource stop criteria, the record keeping repository comprising a ledger of resource transfers received from a plurality of users.

In some embodiments, or in combination with any of the embodiments described herein, the system is configured for identifying one or more resource transfers in the record keeping repository which violate the resource transfer stop criteria, wherein identifying comprises comparing the ledger of resource transfers in the record keeping repository to the resource transfer stop criteria in the resource transfer stop repository.

In some embodiments, or in combination with any of the embodiments described herein, the system is configured for flagging the one or more resource transfers in the record keeping repository which violate the resource transfer stop criteria.

In some embodiments, or in combination with any of the embodiments described herein, the system is configured for transmitting a notification to the user of the flagged one or more resource transfers on a user device of a channel, wherein the notification comprises an approval prompt.

In some embodiments, or in combination with any of the embodiments described herein, the system is configured for transmitting a notification to the merchant of the flagged one or more resource transfer to notify the merchant of a disposition.

In some embodiments, or in combination with any of the embodiments described herein, the one or more resource transfers between the user and the merchant is a recurring resource transfer, the recurring resource transfer initiated by triggering parameters comprising at least one of: a time interval, a calendar date occurrence, or an inventory level.

In some embodiments, or in combination with any of the embodiments described herein, the approval prompt is configured to receive an input from the user and transmit the input from the user to the entity.

In some embodiments, or in combination with any of the embodiments described herein, the input from the user comprises a command to amend the resource transfer stop criteria, the command comprising at least one of: adjusting the effective dates, deleting the resource transfer stop criteria, and adjusting monetary thresholds.

In some embodiments, or in combination with any of the embodiments described herein, executing the query of the record keeping repository further comprises parsing the query and querying an indexed database.

In some embodiments, or in combination with any of the embodiments described herein, the approval prompt is configured to receive an input from the user and transmit the input from the user to the entity.

In some embodiments, or in combination with any of the embodiments described herein, executing the query of the record keeping repository further comprises parsing the query and querying an indexed database.

In some embodiments, or in combination with any of the embodiments described herein, the input from the user comprises a command to amend the resource transfer stop criteria, the command comprising at least one of: adjusting the effective dates of the resource transfer stop criteria, deleting the resource transfer stop criteria, and adjusting monetary thresholds of the resource transfer stop criteria.

In some embodiments, or in combination with any of the embodiments described herein, the system is configured for issuing a resource credit to the user's account for the flagged one or more resource transfers.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made to the accompanying drawings, wherein:

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Embodiments of the invention are directed to a system, method, or computer program product for resource transfer monitoring and authorization. The system allows for backend batch monitoring and processing of resource transfers and subsequent authorization or de-authorization of resource transfers within an entity in order to comply with user-provided instruction to stop payments with one or more merchants. In this way, a user may have requested non-payment of one or more recurring resource transfers such as a subscription service or the like, and the embodiments described herein provide systems, methods, or computer program products for verification that the non-payment request is being fulfilled as intended.

As used herein, a "resource transfer" may refer to any activities or communication between a user or entity and the financial institution, between the user and the entity, between multiple entities, transfers between technology applications or the like. A resource transfer may refer to a payment, processing of funds, purchase of goods or services, a return of goods or services, a payment transaction, a credit transaction, or other interactions involving a user's resource or account. In the context of a financial institution or a resource entity such as a merchant, a resource transfer may refer to one or more of: transfer of resources/funds between financial accounts, withdrawal of resources or funds from a financial account, a sale of goods and/or services, a rewards transfer, or any other interaction involving the user and/or the user's device that invokes or that is detectable by or associated with the financial institution. A resource transfer may also include one or more of the following: renting, selling, and/or leasing goods and/or services (e.g., groceries, stamps, tickets, DVDs, vending machine items, or the like); making payments to creditors (e.g., paying monthly bills; paying federal, state, and/or local taxes; or the like); sending remittances; loading money onto stored value cards (SVCs) and/or prepaid cards; donating to charities; and/or the like. Unless specifically limited by the context, a "resource transfer," or a "transaction" refers to any user activity (financial or non-financial) initiated between a user and a resource entity (such as a merchant), between the user and the financial institution, or any combination thereof. In some embodiments, a resource transfer or transaction may refer to financial transactions involving direct or indirect movement of funds through traditional paper transaction processing systems (i.e. paper check processing) or through electronic transaction processing systems. In this regard, resource transfers or transactions may refer to the user initiating a funds/resource transfer between account, funds/resource transfer as a payment for the purchase for a product, service, or the like from a merchant, or the like. Typical financial transactions or resource transfers include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated or validated it could mean that the transaction has already occurred, is in the process of occurring or being processed, or it has yet to be processed/posted by one or more financial institutions.

In some embodiments, a resource transfer may refer to a recurring resource transfer, such as a user-enrolled subscription transaction wherein the user engages in resource transfers on a periodic basis in exchange for access to a product or service. In some embodiments, these resource transfers on a periodic basis occur automatically and the merchant may not actively seek approval of the resource transfer prior to the date of the transfer. A recurring resource transfer may be initiated by triggering parameters such as date or time passage (e.g. calendar occurrence or time intervals) and may take place on a daily, weekly, monthly, bi-weekly, bi-monthly, yearly basis, or the like, or in some embodiments the recurring resource transfer may occur automatically when triggered by triggering parameters such as an event based on a merchant-monitored metric such as low/no data allotment, low inventory levels, low/no cellular minutes or text messages available, low/no available entry passes for a place of business, or the like.

As used herein, an "entity" or "enterprise" may refer to any institution or establishment, associated with a network connected resource transfer platform. As such, the entity may be any institution, group, association, financial institution, merchant, establishment, company, union, authority or the like.

As described herein, a "user" is an individual associated with an entity. As such, in some embodiments, the user may be an individual having past relationships, current relationships or potential future relationships with an entity. In some embodiments, a "user" may be an employee (e.g., an associate, a project manager, an Information Technology ("IT") specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein. In the instances where the entity is a resource entity or a merchant, financial institution or the like, a user may be an individual or entity with one or more relationships, affiliations or accounts with the entity (for example, the merchant, the financial institution). In some embodiments, the user may be an entity or financial institution employee (e.g., an underwriter, a project manager, an IT specialist, a manager, an administrator, an internal operations analyst, bank teller or the like) capable of operating the system described herein. In some embodiments, a user may be any individual or entity who has a relationship with a customer of the entity or financial institution. For purposes of this invention, the term "user" and "customer" may be used interchangeably. A "technology resource" or "account" may be the relationship that the user has with the entity. Examples of technology resources include a deposit account, such as a transactional account (e.g. a banking account), a savings account, an investment account, a money market account, a time deposit, a demand deposit, a pre-paid account, a credit account, a non-monetary user information provided by the user, or the like. The technology resource or account is typically associated with and/or maintained by an entity, and is typically associated with technology infrastructure such that the resource or account may be accessed, modified or acted upon by the user electronically, for example using or transaction terminals, user devices, merchant systems, or the like. In some embodiments, the entity may provide one or more technology instruments or financial instruments to the user for executing resource transfer activities or financial transactions. In some embodiments, the technology instruments/financial instruments like electronic tokens, credit cards, debit cards, checks, loyalty cards, entity user device applications, account identifiers, routing numbers, passcodes or the like are associated with one or more resources or accounts of the user. In some embodiments, an entity may be any institution, group, association, club, establishment, company, union, authority or the like with which a user may have a relationship. In some embodiments, the entity represents a vendor or a merchant with whom the user engages in financial (for example, resource transfers like purchases, payments, returns, enrolling in merchant accounts or the like) or non-financial transactions (for resource transfers associated with loyalty programs or the like), either online or in physical stores.

As used herein, a "channel" refers to any method of communication used by an entity to interact with its users, or used by users to interact with an entity, including, but not limited to, computer webpages, mobile device applications, mobile device web services, telephone communications, text/SMS messages, voice-enabled personal assistants, facsimile, postal services, or the like.

As used herein, a "user device" is any device or software of a channel that allows a user or an user associated with an entity to input information, such as commands or data, into a device, or that allows the device to output information to the user. For example, the user device includes a graphical user interface (GUI) or an interface to input computer-executable instructions that direct a processing device to carry out specific functions. The user device typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

Figure 1:
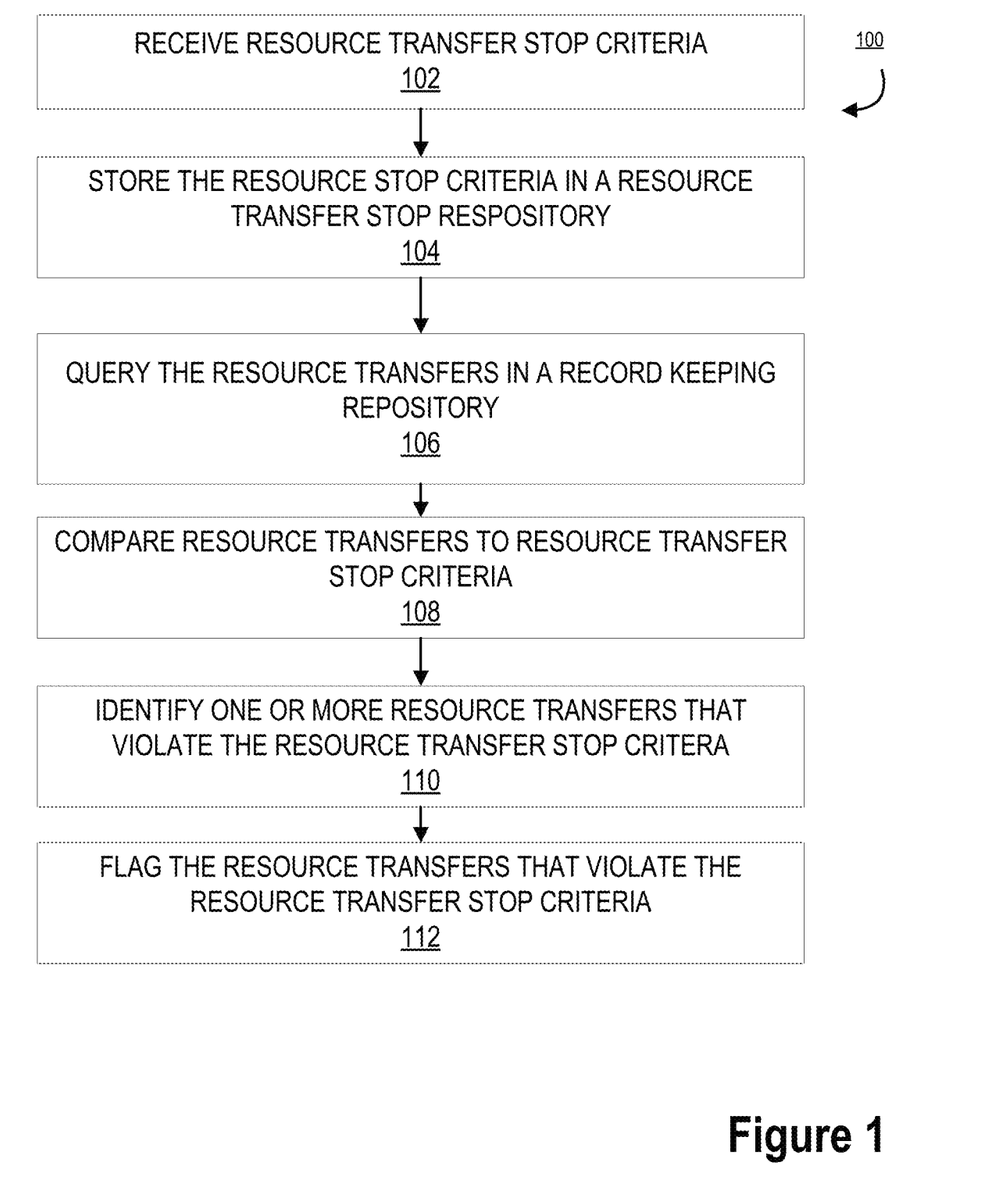
FIG. 1 is a block diagram of a method for resource transfer and monitoring, in accordance with embodiments of the present invention.

FIG. 1 illustrates a block diagram 100 of a method for resource transfer and monitoring, in accordance with some embodiments of the present invention. As illustrated in block 102, the process begins by receiving resource transfer stop criteria. The resource transfer stop criteria may be provided to an entity by a user. The resource transfer stop criteria may also be provided by a user associated with an entity on behalf of another user. In some embodiments, the resource transfer stop criteria may comprise specific information identifying a merchant, or specific effective dates, times, or minimum and maximum monetary thresholds for resource transfers to be stopped. As previously described, this resource transfer may be recurring, or it may be a one-time resource transfer. As such, the user may engage with an entity to prevent any future or current resource transfers from occurring. For example, the user may not be able to communicate directly with a merchant, or the communications with the merchant have not been successful, and as such the user may contact a financial institution directly in order to stop resource transfers between the user and the merchant. In this way, any current, pending, or future resource transfers between the user and the merchant may be stopped, reversed, or credited, back to the account of the user.

At block 104, the process 100 continues by storing the resource stop criteria in a resource transfer stop repository. In this way, the resource transfer stop criteria may be searchable, indexable, or the like.

The resource transfer stop repository may comprise resource transfer stop criteria. The resource transfer stop criteria may comprise information or instructions regarding the types of resource transfers which the user requests to have stopped. For example, a user may request to stop all resource transfers from a particular merchant, or any merchant with resource transfers above or below a certain monetary amount, or all merchants with recurring resource transfers, or the like. The resource transfer stop criteria may also comprise effective date ranges (a start date and an end date of one or more calendar years) and/or times for which the user has requested a stop in resource transfers.

In some embodiments described herein, an entity may keep records of the stop resource transfer stop criteria for a plurality of users, and as such the entity may store the records in a resource transfer stop repository. The resource transfer stop criteria may be converted to an encrypted data format prior to storing in the resource transfer stop repository, such that the resource transfer stop criteria must be decrypted in order to access the specifics of the resource transfer stop criteria and utilize the information stored thereon. In this way, the details of the resource transfer stop request, which may comprise private information, are secure and may require an encryption or decryption key in order to access it.

At block 106, the process 100 continues by querying the resource transfers in a record keeping repository, such that the resource transfers in the repository are searchable using specific search functions. Prior to querying the resource transfers (or resource transfer stop criteria), the system may be provided with, or generate autonomously, a query string in order to search the repository. In this way, the entity may create a query comprising a resource stop criteria and use the query to find resource transfers which violate the resource transfer stop criteria. It shall be appreciated that in other embodiments of the invention, the resource transfers are used as the basis for search functions used to query the record keeping repository.

The query may be parsed by the system, such that the system may operate the query in the most optimal and resource-efficient manner. As such, the query time and resource usages will be minimized. Once a query is received, it may then be parsed (e.g. translated) into optimizable and manipulatable structures. The system may also comprise an optimizer, which receives the parsed query and creates and executes a plan for retrieving the resource transfer or resource transfer stop request. The parsing may be conducted using an optimizer, such that attributes (e.g., what type of expressions are involved, whether the tables or indexes are available, number and type of tables, and the like) are considered by the optimizer prior to executing the query and retrieval and/or comparison.

The record keeping repository may comprise a ledger or a list of all resource transfers that have occurred at any given time. An entity may keep records of the pending, completed, and/or forthcoming resource transfers for a plurality of users. As such, the entity may store these records in a record keeping repository, which comprises a plurality of ledgers comprising lists of resource transfers. The resource transfers may be converted to an encrypted data format prior to storing in the record keeping repository, such that the resource transfer must be decrypted in order to access the specifics of the resource transfer and utilize the information stored thereon. In this way, the details of the resource transfer, which may comprise private information, are secure and may require an encryption or decryption key in order to access it.

Additionally, the record keeping repository may comprise an index structured to improve the querying and retrieval and/or comparison of the resource transfer. Similarly, the resource transfer stop repository may also comprise an index. Index formatting may be such that it includes, but is not limited to, a hash index, bitmap index, secondary index, primary index, reverse index, sparse index, dense index, or the like. Furthermore, the index is configured to allow for querying the record keeping repository and/or resource transfer stop repository using user-defined functions in a query. In some embodiments of the invention, the indexed record keeping repository may be queried using resource transfer stop criteria, such as name of merchant, name of user, threshold resource amounts, or the like. In other embodiments, the indexed resource transfer stop repository may be queried using resource transfers, such as merchant name, resource transfer date, user name, or the like.

At block 108, the process 100 continues by comparing the resource transfers to resource transfer stop criteria. A resource transfer may be taken individually or as a group (e.g. a plurality of resource transfers, organized in any way) and compared to one or more resource transfer stop criteria. Alternatively, resource transfer stop criteria may be taken individually or as a group and compared to one or more resource transfers. A comparison comprises the system taking a variable of a first (e.g. the merchant name of the resource transfer) and matching the same variable of the second (e.g. the merchant name of the resource transfer stop criteria). Such variables may comprise merchant name, user name, resource transfer amount, and so forth. Once a match has been produced, the system may continue to compare the previously matched pair with the same merchant name, for example by taking the user name of the resource transfer and matching with the user name of the resource transfer stop criteria, and so forth, until all the variables have been determined to be the same or similar. In some embodiments described herein, a resource transfer on the record keeping repository, which is pending, completed, or forthcoming, may be compared to the resource transfer stop criteria to determine if it violates any of the resource transfer stop criteria. In some embodiments described herein, the record keeping repository may be queried and/or searched, by a searching tool to determine (by comparing) which resource transfers are in compliance with the resource transfer stop criteria, and which are in violation. In some embodiments described herein, the searching tool may query the record keeping repository and/or resource transfer stop repository in a manner such that it queries on a periodic basis (e.g., every X minutes, hourly, daily, or the like); in other embodiments, the searching tool may query continuously such as to minimize the time between a resource transfer and comparing the resource transfer to the resource transfer stop repository. In yet another embodiment, the searching tool may query only those resource transfers from one or more selected merchants or users.

At block 110, the process 100 continues by identifying one or more resource transfers that violate the resource transfer stop criteria. As such, the system is configured to identify which resource transfers violate the resource transfer stop criteria by analyzing each of the resource transfers and comparing to the resource stop criteria. At block 112, the process 100 continues by flagging the resource transfers that violate the resource transfer stop criteria. The system, after identifying which resource transfers violate the resource transfer stop criteria, marks or flags the resource transfer in such a way as to notify the system of the violation and quickly allow the system to reference the specific resource transfer in violation to optimize indexing and search at later steps of the process. A violation occurs when the resource transfer has been identified to not comply with the resource transfer stop criteria, and as such, the resource transfer in the ledger is not in compliance with the request of the user. Under such circumstances, the resource transfer may be "flagged" or marked in a way such that the resource transfer may be assigned a disposition such as reversing, crediting the user, stopping, holding, or the like. In some embodiments described herein, when a resource transfer is found to be in violation of the resource transfer stop criteria, the disposition occurs immediately. In other embodiments described herein, the resource transfer may be flagged for later review by a user associated with the entity in order to confirm or deny the violation.

Figure 2:
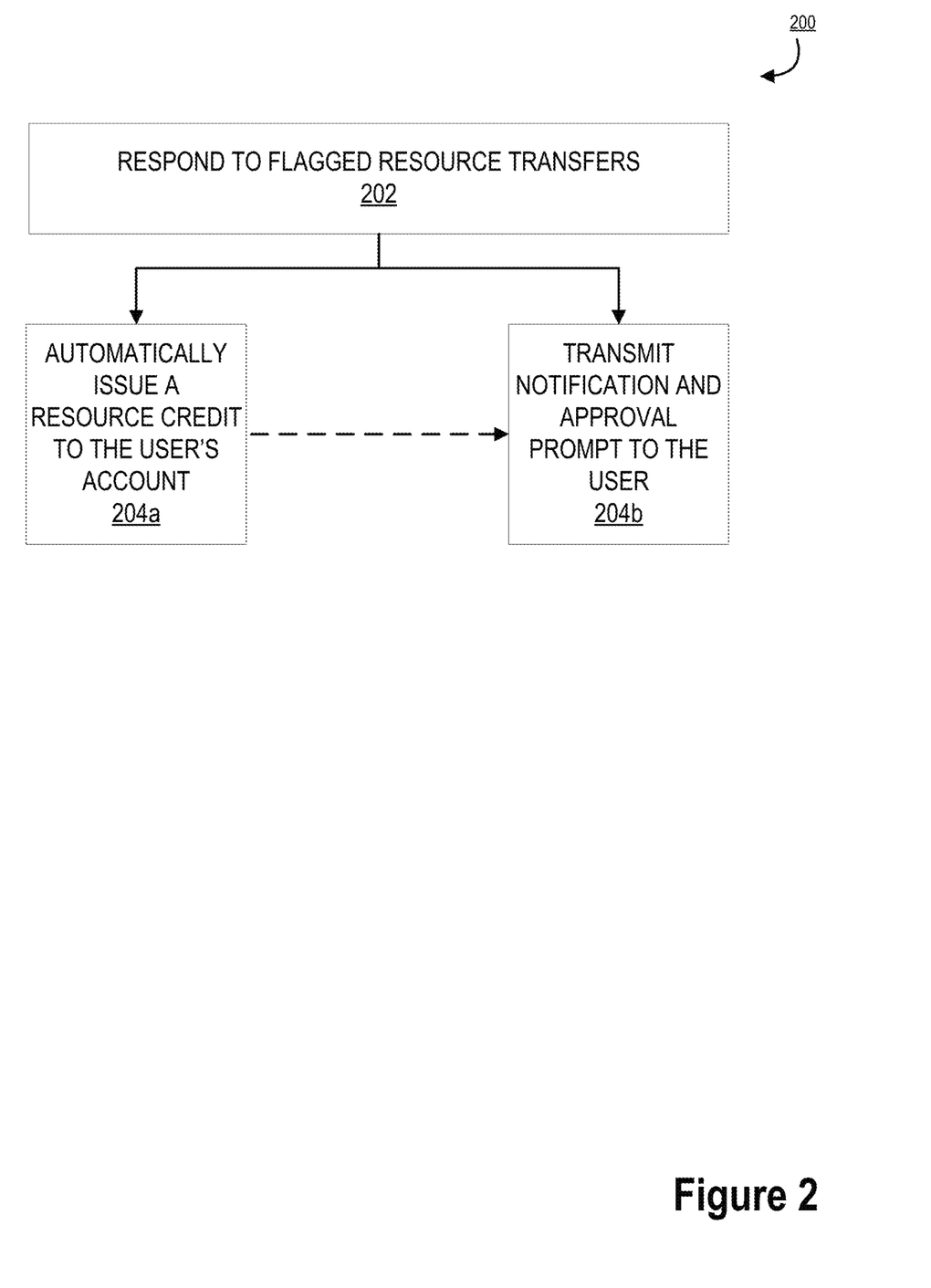
FIG. 2 is a block diagram of a method for resource transfer and monitoring, in accordance with embodiments of the present invention.

FIG. 2 illustrates a block diagram 200 of a method for disposition of the flagged resource transfer, in accordance with some embodiments of the present invention. As illustrated in block 202, the process is initiated by a flagged resource transfer. After a resource transfer has been flagged, the system is configured to execute one or more of subsequent steps of the method. The order in which the subsequent steps, blocks 204a and 204b, are performed, may be dictated by a variety of factors. These factors may include, but are not limited to. the amount of time which has elapsed since the resource transfer was initiated and said resource transfer was flagged, the status of the resource transfer (e.g. "pending", "complete", "posted", "in process" or the like), the preference of the entity, the resource transfer history between the entity and the user, the resource transfer history between the entity and the merchant, the type of vehicle used for the resource transfer (e.g. card, wire transfer, auto-drafting, or the like), day of the week, time of day, or the like.

At block 204a, the process 200 automatically issuing a resource credit to the user's account. In this way, the user who has ownership of the account may receive resources automatically for instances where the resource transfer was acknowledged to be in violation of the user's resource transfer stop criteria. As such, this may reduce or eliminate the amount of time required for the user and the entity to correct the violation manually. In some embodiments described herein, the disposition of a resource transfer found to be in violation of one or more resource transfer stop criteria may comprise crediting the resources back to the user, deleting the resource transfer from the ledger of a user, placing a temporary hold on further processing, or the like. Depending on the finality of the resource transfer, further action may be required to request and/or notify the merchant of the disposition such that the merchant may take appropriate actions such as cancellation of products and/or services, refunding of the resourced back to the entity and/or user, or the like.

At block 204b, the process 200 transmits a notification to the user. In some embodiments disclosed herein, the notification may just be a notice that the resource credit issuance has occurred. In other embodiments, the notice may ping or alert the user to provide input on a specific resource transfer event such that the system allows the user to have more control over the resource transfer event. The alert may provide an approval prompt the user to approve or decline a resource transfer. In this way, if a resource transfer is approved, the entity may reverse the action taken at block 204b and remove resources from the account and transfer the resources to the vendor. A user may receive a notification or alert on a user device of a channel, such that the user may be made aware that a resource transfer associated with the user was determined to be in violation of one or more resource transfer stop criteria. In some embodiments, this notification may be a notification such that it simply informs the user of the violation. In other embodiments, the notification may provide an approval prompt such that it poses a disposition prompt to the user, seeking a user input to remove or alter the resource transfer. In yet additional embodiments, the notification may be such that it requires the user to contact the entity for further details regarding the violation. In some embodiments, a user may request in response to an approval prompt that the resource transfer be allowed, despite the resource transfer being flagged to be in violation of one or more resource transfer stop criteria. In this way, the system may be configured to allow the resource transfer or reverse any actions which have already occurred. This may include recalling any notification to the merchant, applying the transaction to the account of the user, or the like.

As previously described, the process described in block 204b may occur before, during, or after the process in block 204a. As such, the system may transmit a notification to the user with a prompt, to which the user is requested to indicate on the prompt the disposition of the flagged resource transfer. Subsequently, and depending on the indication provided by the user during the notification of block 204b, the system may issue a resource credit to the user's account. If the user indicates otherwise, the system may not issue a resource credit to the user's account. In some embodiments, the system is configured to issue a resource credit to the account of the user prior to the user receiving a notification and approval prompt. In this way, the system may determine that it is unlikely that the user will request not to have the resources issued to their account, and as such this preemptive action may prevent unnecessary follow-ups from the user to the entity. In yet additional embodiments, the resource credit may be issued to the user's account at approximately the same time as the notification has been transmitted to the user along with the approval prompt.

Figure 3:
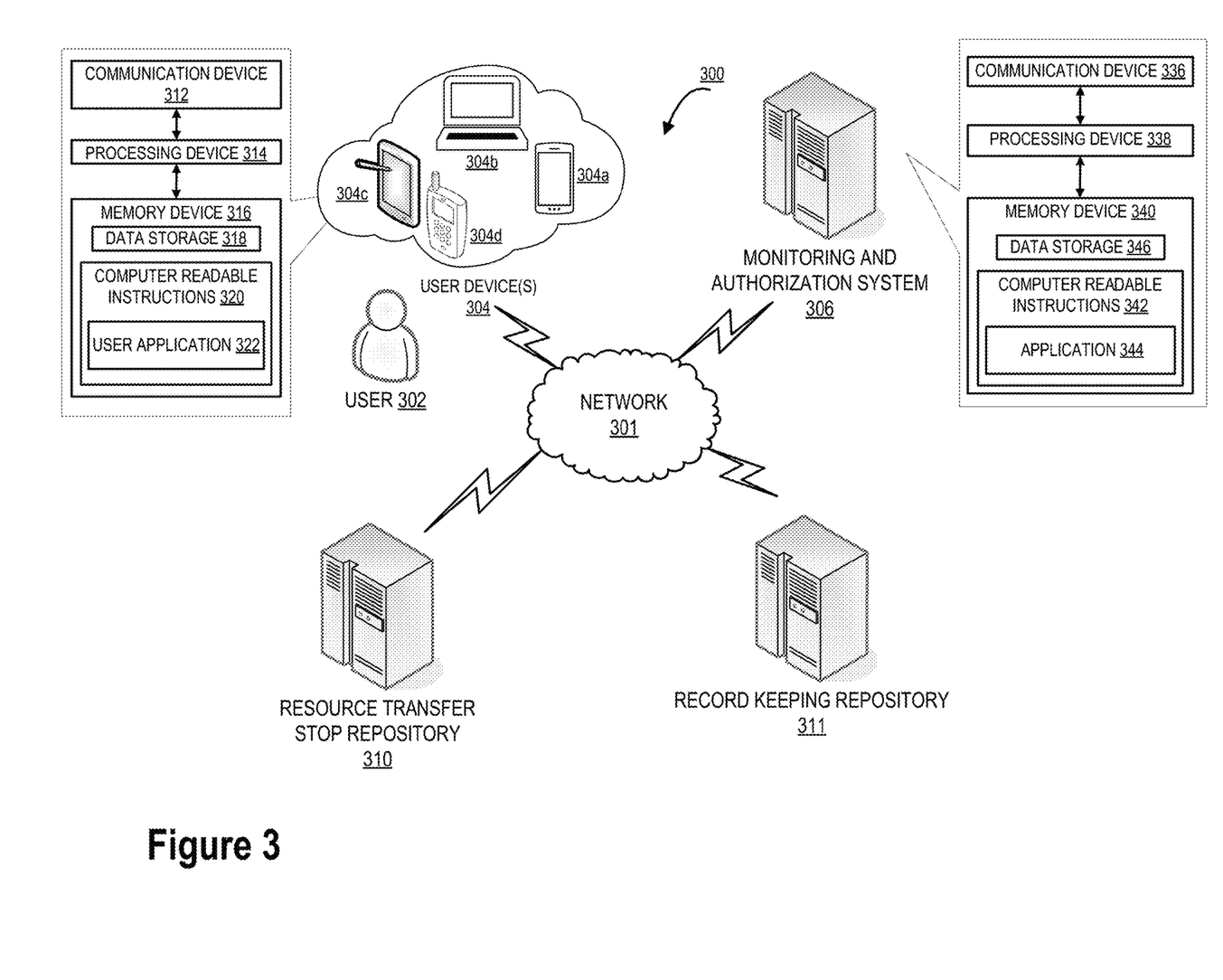
FIG. 3 illustrates a network environment in which the processes described herein are implemented, according to some embodiments of the present invention.

FIG. 3 provides a resource transfer monitoring and authorization system environment 300, in accordance with one embodiment of the present invention. As illustrated in FIG. 3, the monitoring and authorization system 306 is operatively coupled, via a network 301 to the user device 304, to resource transfer stop repository 310, and to record keeping repository 311. In this way, the monitoring and authorization system 306 can send information to and receive information from the user device 304, the resource transfer stop repository 310, and the record keeping repository 311. FIG. 3 illustrates only one example of the system environment 300, and it will be appreciated that in other embodiments one or more of the systems, devices, or servers may be combined into a single system, device, or server, or be made up of multiple systems, devices, or servers.

The network 301 may be a global area network (GAN), such as the Internet, a wide area network (WAN), a local area network (LAN), or any other type of network or combination of networks. The network 301 may provide for wireline, wireless, or a combination wireline and wireless communication between devices on the network.

As illustrated in FIG. 3, the monitoring and authorization system 306 generally comprises a communication device 236, a processing device 238, and a memory device 240. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 238 is operatively coupled to the communication device 236 and the memory device 240. The processing device 238 uses the communication device 236 to communicate with the network 301 and other devices on the network 301, such as, but not limited to the channel system 308, the user device 304, the resource transfer stop repository 310, and the record keeping repository 311. As such, the communication device 236 generally comprises a modem, server, or other device for communicating with other devices on the network 301.

As further illustrated in FIG. 3, the monitoring and authorization system 306 comprises computer-readable instructions 242 stored in the memory device 240, which in one embodiment includes the computer-readable instructions 242 of an application 244. In the embodiment illustrated in FIG. 3 and described throughout much of this specification, the application 244 may perform the functions disclosed herein. The monitoring and authorization system 306 compares the rules set forth in the resource transfer stop repository 310 and compares them to the record keeping repository 311, then communicates with monitoring and authorization system 306.

FIG. 3 also illustrates a user device 304. The user device 304 may be any communication device such as a smart phone 304a, a telephone 304d, a tablet 304c, a computer 304b, or the like. The user device 304 generally comprises a communication device 312, a processing device 314, and a memory device 316. The processing device 314 is operatively coupled to the communication device 312 and the memory device 316. The processing device 314 uses the communication device 312 to communicate with the network 301 and other devices on the network 301, such as, but not limited to the monitoring and authorization system 306, the resource transfer stop repository 310, and the record keeping repository 311. As such, the communication device 312 generally comprises a modem, server, or other device for communicating with other devices on the network 301.

As further illustrated in FIG. 3, the user device 304 comprises computer-readable instructions 320 stored in the memory device 316, which in one embodiment includes the computer-readable instructions 320 of a user application 322 and data storage 318. A user device 304 may be any mobile communication device, such as a cellular telecommunications device (i.e., a cell phone or mobile phone), personal digital assistant (PDA), a mobile Internet accessing device, or other mobile device including, but not limited to portable digital assistants (PDAs), pagers, mobile televisions, voice assistants, laptop computers, cameras, video recorders, audio/video player, radio, GPS devices, any combination of the aforementioned, or the like. Although only one user device 304 is depicted in FIG. 3, the system environment 300 may comprise a plurality of mobile devices 304.

It is understood that the servers, systems, and devices described herein illustrate one embodiment of the invention. It is further understood that one or more of the servers, systems, and devices can be combined in other embodiments and still function in the same or similar way as the embodiments described herein.

Figure 4:
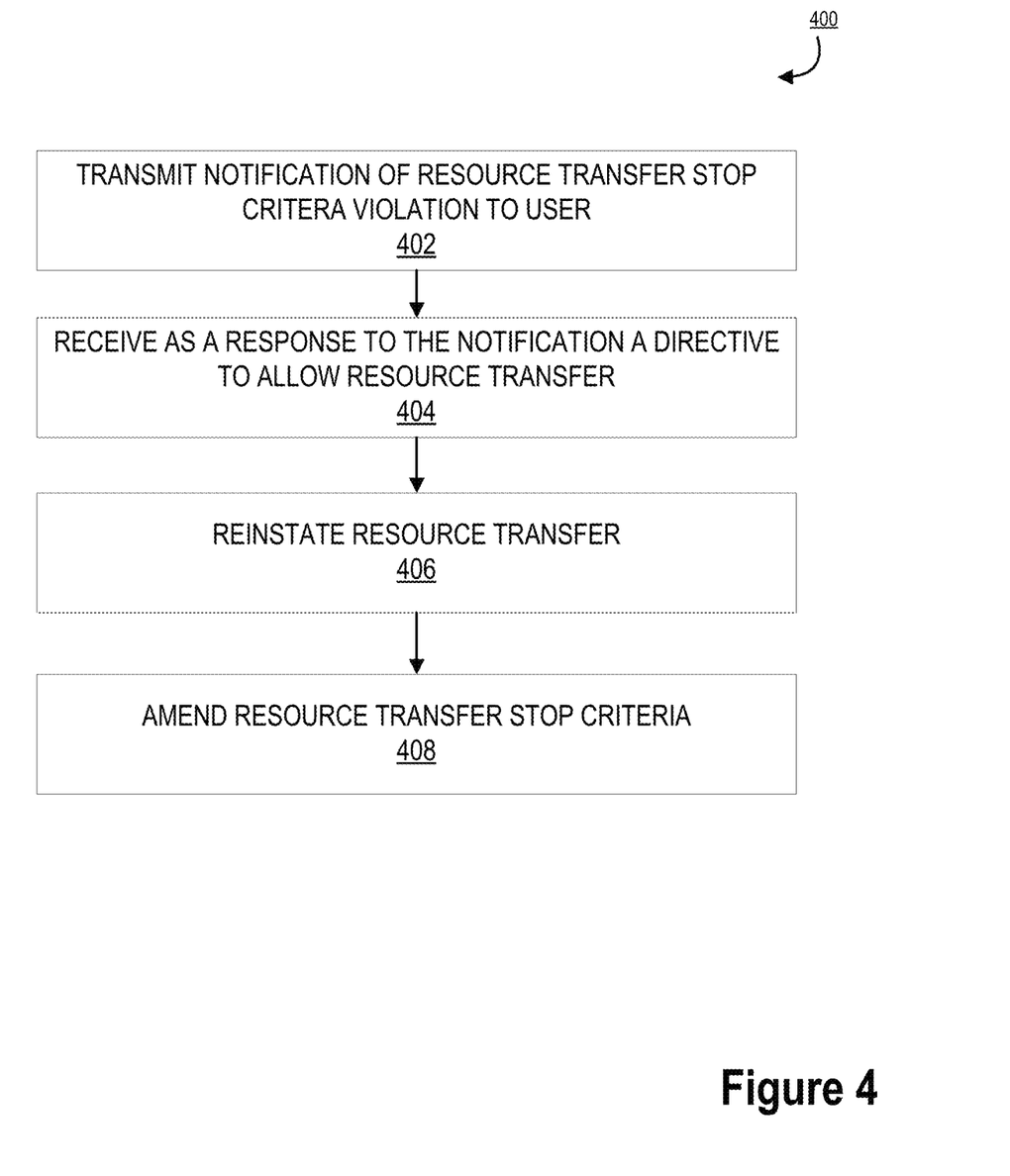
FIG. 4 is a block diagram of a method for resource transfer and monitoring, in accordance with embodiments of the present invention.

FIG. 4 illustrates a block diagram 400 of a method for resource transfer and monitoring, in accordance with some embodiments of the present invention, wherein the embodiment is configured to transmit a notification with an approval prompt to a user when a resource transfer is found to be in violation of a resource transfer stop criteria. As illustrated in block 402 a notification of resource transfer stop criteria violation is transmitted to a user. This may occur along any given user device of any given channel. For example, this notification may be provided to a mobile device of a user with an account associated with the entity, or the notification may be provided to a voice-enabled personal assistant of the user, or the like. In this way, the user is notified that a resource transfer has occurred which the entity has found to be in violation of a resource transfer stop criteria. The system may be configured to prompt the user to provide input or a response to an approval prompt in order to confirm the resource transfer complies with the user's directives or previously administered resource transfer stop criteria. As illustrated in block 404, the system is configured to receive a response to the notification from a user. This may be a simple "yes", "no", deferment to speak with a user associated with an entity, or the like. In this way, the entity is notified through the channel as to the user's desires and is prepared to take action such that the resource transfer is either removed, reversed, held, or the like, in the account of the user.

As illustrated in block 406, for illustrative purposes only, a user may request that the resource transfer be permitted and as such the resource transfer stop criteria should be ignored. In this way, the resource transfer is reinstated and resources from the user's account may be transferred to the merchant. In some embodiments of this invention, the user may be provided with options for duration/timing of future permission of resource transfer stop criteria. For one non-limiting example, a user may wish the resource transfer to proceed for the next 3 months, but request that thereafter the resource transfers should be stopped according to the resource transfer stop criteria.

Block 408 illustrates the amendment of resource transfer stop criteria such that future resource transfers will behave differently and not necessarily be flagged by the system. Continuing with the previous non-limiting example, the user has received a notification that a resource transfer violates resource transfer stop criteria. The user may wish for the resource transfer to proceed and inputs as a response to the notification detailing as such. The user then may be presented with one or more options to set a time interval or time period for the future reinstatement of the resource transfer stop criteria, such that after 3 months, for example, the resource stop criteria is re-implemented, or "reinstated" and the entity will continue monitoring and notifying the user of any resource transfers which violate the resource stop criteria after the provided time period. In other instances, the user may wish to permanently remove the resource transfer stop criteria altogether, and as such the resource transfer stop criteria is amended to be removed.

Figure 5:
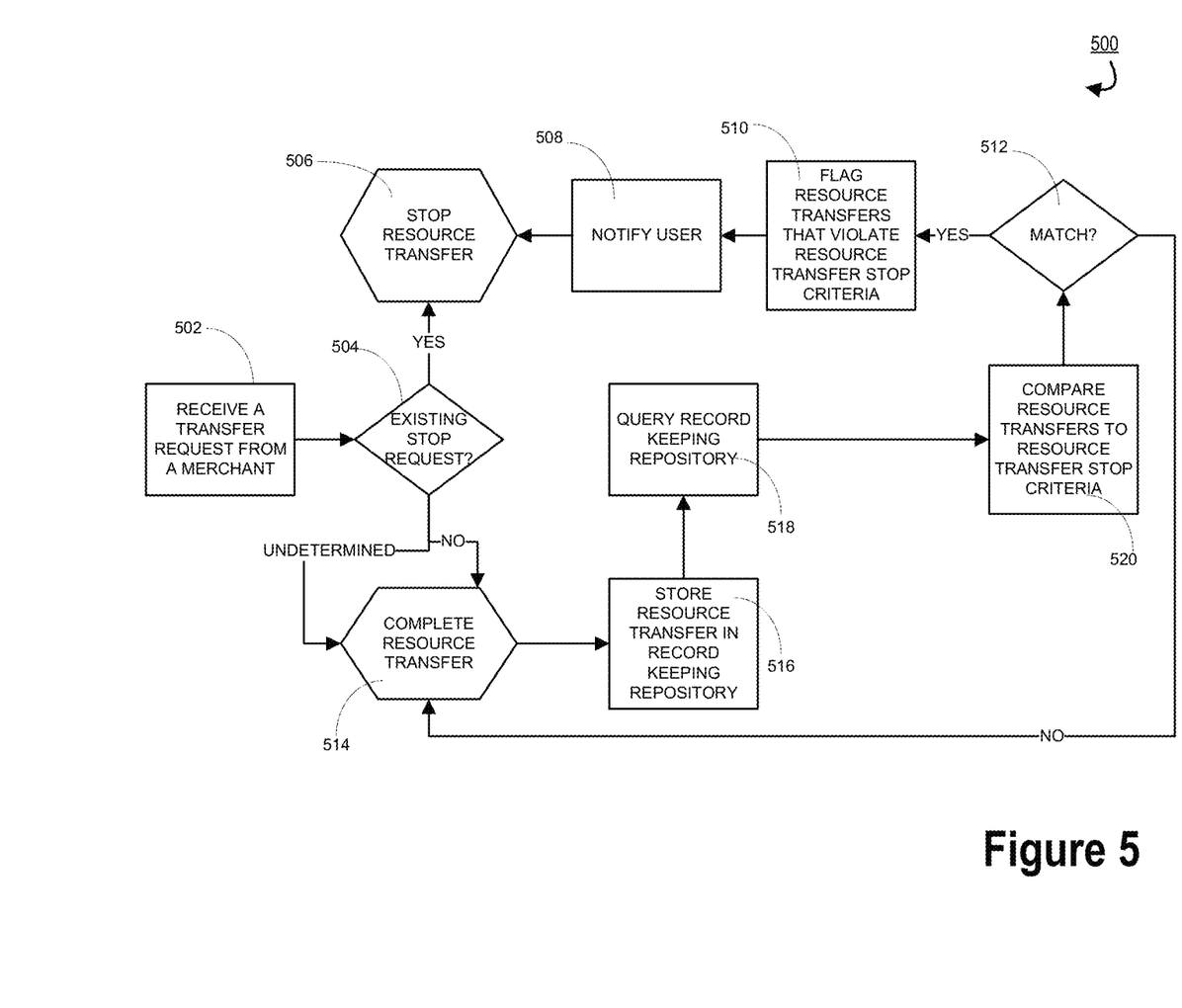
FIG. 5 is a flow diagram of a method for resource transfer and monitoring, in accordance with embodiments of the present invention.

FIG. 5 illustrates a high-level decision tree to illustrate the present invention in context of an overall process flow 500. As shown in block 502, an entity may receive a resource transfer request from a merchant. This resource transfer request is a request for processing of a resource transfer that may be a recurring, periodic, or subscription service type of request in some embodiments. In other embodiments, any resource transfer from any particular merchant or to a specific user may be considered as pertaining to the present invention and embodied in block 502. The entity, upon receiving the resource transfer request from a merchant in block 502, will have the opportunity to collect information about the resource transfer and make a determination if there is an existing resource transfer stop criteria in connection with the user and/or the merchant, as shown in block 504. In this way, if the entity knows of resource transfer stop criteria, the entity may decline the resource transfer during the transaction in order to prevent the resource transfer from occurring, as shown in block 506. However, in some instances the entity may not yet be made aware of the resource transfer stop criteria, or there may not be one, and as such an existing resource transfer stop criteria is undetermined or known to not exist and the entity must proceed with block 514 where the resource transfer is completed. While a resource transfer may be "completed" as illustrated in FIG. 5, it is understood that the resource transfer may still be considered "pending" and not yet finalized for a length of time not considered in scope for FIG. 5. Once a resource transfer is completed, it is stored in a record keeping repository of an entity in a ledger, balance sheet, or the like, as illustrated in block 516.

Continuing to block 518, the record keeping repository may be routinely queried, periodically or continuously, in some embodiments of the invention described herein. As such, the documentation and recordation of each resource transfer is gathered and analyzed by the system such that each resource transfer may be compared to a database of resource transfer stop criteria as shown in block 520. This comparison process may search for matches in user name and/or ID for user accounts comprising requests for resource transfer stoppage, or it may search and/or prioritize individual merchants known to the system to have frequent resource transfer stop criteria associated with it. The request for resource transfer stoppage, when enacted, outputs unique resource transfer stop criteria which are stored in a repository such as the resource transfer stop repository. Alternatively, in some embodiments, the resource transfer stop repository itself may be queried instead, using details of the current transactions at any given time. Regardless of which repository is being queried and searched, the system is configured to determine whether a match to a completed resource transfer exists between the completed resource transfer and the resource transfer stop criteria, as shown in block 512. If such a match does not occur, the resource transfer is either left alone and allowed to remain in its current state or it is further flagged to have been validated as a resource transfer allowed by the user. In this way, the resource transfer is completed as shown in block 514. In scenarios where a match has been positively determined between a resource transfer and resource transfer stop criteria, the resource transfer is flagged as being in violation of the resource stop criteria as shown in block 510. Examples of resource transfer stop criteria may include merchant name, user name, effective dates and or times for which the resource transfer stop is expected to occur, minimum or maximum resource or monetary limits for resource transfers to be stopped, geographic locations, or the like.

The action of flagging a resource transfer which has violated resource transfer stop criteria may have several outcomes. In some embodiments as described herein, a user associated with an entity may be tasked with validating or verifying that the matching performed was successful, and that one or more of the resource transfer stop criteria have been satisfied. In some embodiments of the invention, the flagging of a resource transfer may comprise marking the entry within the database of the record keeping repository. Once identified as a match, it may be appropriate in some embodiments of the invention to notify a user that a match has been made as shown in block 508. In some embodiments this notification may be made along a user device of any of the channels within an entity, such as via mobile phone application, telephone, tablet, personal voice assistant, personal computer, or the like. The notification may comprise a user prompt requesting the user to accept or decline the resource transfer. In this way, a user has more control and visibility of their resource transfers and the user may not be required to communicate with the entity or a user associated with an entity in order to prevent or approve of the resource transfer. If the resource transfer is flagged or positively identified by the user to be in conflict with the resource transfer stop criteria, the system issues a command to stop the resource transfer, as illustrated in block 506. The stopping of the resource transfer may comprise one or more of: deleting the transaction, issuing a credit to the account of a user, notifying the merchant, or the like.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, or the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more general-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, or the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for resource transfer monitoring and authorization, the system comprising:
    a memory device with computer-readable program code stored thereon;
    a communication device;
    a processing device operatively coupled to the memory device and the communication device, wherein the processing device is configured to execute the computer-readable program code to:
        receive, from a user, resource transfer stop criteria for one or more resource transfers between the user and a merchant, wherein the resource transfer stop criteria is provided to an entity by the user, and wherein the resource transfer stop criteria comprises a merchant name for which stopping the one or more resource transfers is expected;
        store the resource transfer stop criteria in a resource transfer stop repository, wherein storing the resource transfer stop criteria comprises creating an index in the resource transfer stop repository and encrypting the resource transfer stop criteria;
        execute a query of a record keeping repository with the resource transfer stop criteria, the record keeping repository comprising a ledger of resource transfers received from a plurality of users, wherein the record keeping repository is indexed and is configured to be queried using the merchant name of the one or more resource transfers;
        identify one or more resource transfers in the record keeping repository which violate the resource transfer stop criteria, wherein identifying comprises comparing the merchant name in the ledger of resource transfers of the record keeping repository to the merchant name in the resource transfer stop criteria of the resource transfer stop repository;
        flag the one or more resource transfers in the record keeping repository which violate the resource transfer stop criteria;
        transmit a notification of the flagged one or more resource transfers to a user device of a channel, wherein the notification comprises an approval prompt;
        receive, via an input from the user to the approval prompt, a time interval for future reinstatement of the resource transfer stop criteria; and
        transmit the input from the user device to the entity.

2. The system of claim 1, wherein the processing device is further configured to execute the computer-readable program code to transmit a notification to the merchant of the flagged one or more resource transfers to notify the merchant of a disposition.

3. The system of claim 1, wherein the one or more resource transfers between the user and the merchant is a recurring resource transfer, the recurring resource transfer initiated by triggering parameters comprising at least one of: a time interval, a calendar date occurrence, or an inventory level.

4. The system of claim 1, wherein executing the query of the record keeping repository further comprises parsing the query and querying an indexed database.

5. The system of claim 1, wherein the input from the user comprises a command to amend the resource transfer stop criteria, the command comprising at least one of: adjusting effective dates of the resource transfer stop criteria, deleting the resource transfer stop criteria, and adjusting monetary thresholds of the resource transfer stop criteria.

6. The system of claim 1, wherein the processing device is further configured to execute the computer-readable program code to issue a resource credit to an account of the user for the flagged one or more resource transfers.

7. A computer program product for resource transfer monitoring and authorization, the computer program product comprising at least one non-transitory computer-readable medium having computer-readable program code portions embodied therein, the computer-readable program code portions comprising:
    an executable portion configured for receiving, from a user, resource transfer stop criteria for one or more resource transfers between the user and a merchant, wherein the resource transfer stop criteria is provided to an entity by the user, and wherein the resource transfer stop criteria comprises a merchant name for which stopping the one or more resource transfers is expected;
    an executable portion configured for storing the resource transfer stop criteria in a resource transfer stop repository, wherein storing the resource transfer stop criteria comprises creating an index in the resource transfer stop repository and encrypting the resource transfer stop criteria;

an executable portion configured for executing a query of a record keeping repository with the resource transfer stop criteria, the record keeping repository comprising a ledger of resource transfers received from a plurality of users, wherein the record keeping repository is indexed and is configured to be queried using the merchant name of the one or more resource transfers;

an executable portion configured for identifying one or more resource transfers in the record keeping repository which violate the resource transfer stop criteria, wherein identifying comprises comparing the merchant name in the ledger of resource transfers of the record keeping repository to the merchant name in the resource transfer stop criteria of the resource transfer stop repository;

an executable portion configured for flagging the one or more resource transfers in the record keeping repository which violate the resource transfer stop criteria;

an executable portion configured for transmitting a notification of the flagged one or more resource transfers to a user device of a channel, wherein the notification comprises an approval prompt;

an executable portion configured for receiving, via an input from the user to the approval prompt, a time interval for future reinstatement of the resource transfer stop criteria; and an executable portion configured for transmitting the input from the user device to the entity.

8. The computer program product of claim 7, wherein the computer-readable program code portions further comprise transmitting a notification to the merchant of the flagged one or more resource transfers to notify the merchant of a disposition.

9. The computer program product of claim 7, wherein the one or more resource transfers between the user and the merchant is a recurring resource transfer, the recurring resource transfer initiated by triggering parameters comprising at least one of: a time interval, a calendar date occurrence, or an inventory level.

10. The computer program product of claim 7, wherein executing the query of the record keeping repository further comprises parsing the query and querying an indexed database.

11. The computer program product of claim 7, wherein the input from the user comprises a command to amend the resource transfer stop criteria, the command comprising at least one of: adjusting effective dates of the resource transfer stop criteria, deleting the resource transfer stop criteria, and adjusting monetary thresholds of the resource transfer stop criteria.

12. The computer program product of claim 7, wherein the computer-readable program code portions further comprise issuing a resource credit to an account of the user for the flagged one or more resource transfers.

13. A computer-implemented method for resource transfer monitoring and authorization, the method comprising:

providing a computing system comprising a computer processing device and a non-transitory computer readable medium, where the non-transitory computer readable medium comprises computer program instruction code, such that when the computer program instruction code is operated by said computer processing device, said computer processing device performs the following operations:

receiving, from a user, resource transfer stop criteria for one or more resource transfers between the user and a merchant, wherein the resource transfer stop criteria is provided to an entity by the user, and wherein the resource transfer stop criteria comprises a merchant name for which stopping the one or more resource transfers is expected;

storing the resource transfer stop criteria in a resource transfer stop repository, wherein storing the resource transfer stop criteria comprises creating an index in the resource transfer stop repository and encrypting the resource transfer stop criteria;

executing a query of a record keeping repository with the resource transfer stop criteria, the record keeping repository comprising a ledger of resource transfers received from a plurality of users, wherein the record keeping repository is indexed and is configured to be queried using the merchant name of the one or more resource transfers;

identifying one or more resource transfers in the record keeping repository which violate the resource transfer stop criteria, wherein identifying comprises comparing the merchant name in the ledger of resource transfers of the record keeping repository to the merchant name in the resource transfer stop criteria of the resource transfer stop repository;

flagging the one or more resource transfers in the record keeping repository which violate the resource transfer stop criteria;

transmitting a notification of the flagged one or more resource transfers to a user device of a channel, wherein the notification comprises an approval prompt;

receiving, via an input from the user to the approval prompt, a time interval for future reinstatement of the resource transfer stop criteria; and transmitting the input from the user device to the entity.

14. The computer-implemented method of claim 13, wherein the operations performed by the computer processing device further comprises transmitting a notification to the merchant of the flagged one or more resource transfers to notify the merchant of a disposition.

15. The computer-implemented method of claim 13, wherein the one or more resource transfers between the user and the merchant is a recurring resource transfer, the recurring resource transfer initiated by triggering parameters comprising at least one of: a time interval, a calendar date occurrence, or an inventory level.

16. The computer-implemented method of claim 13, wherein the input from the user comprises a command to amend the resource transfer stop criteria, the command comprising at least one of: adjusting effective dates of the resource transfer stop criteria, deleting the resource transfer stop criteria, and adjusting monetary thresholds of the resource transfer stop criteria.

17. The computer-implemented method of claim 13, wherein the operations performed by the computer processing device further comprises issuing a resource credit to an account of the user for the flagged one or more resource transfers.

* * * * *